(12) United States Patent
Kester

(10) Patent No.: US 7,246,563 B2
(45) Date of Patent: Jul. 24, 2007

(54) PIVOT ASSEMBLY FOR PLANTER CLOSING WHEEL FRAME

(76) Inventor: Philip C. Kester, 3802 Jean St., East Moline, IL (US) 61244

( * ) Notice: Subject to any disclaimer, the term of this patent is extended or adjusted under 35 U.S.C. 154(b) by 220 days.

(21) Appl. No.: 11/180,461

(22) Filed: Jul. 12, 2005

(65) Prior Publication Data

US 2005/0247246 A1  Nov. 10, 2005

Related U.S. Application Data

(62) Division of application No. 10/435,311, filed on May 8, 2003.

(60) Provisional application No. 60/379,380, filed on May 8, 2002.

(51) Int. Cl.
*A01C 5/00* (2006.01)

(52) U.S. Cl. ............... 111/195; 111/200; 172/762; 403/365

(58) Field of Classification Search ........ 111/191–196, 111/200; 172/693, 762, 763, 773; 403/26, 403/71, 87, 168, 365
See application file for complete search history.

(56) References Cited

U.S. PATENT DOCUMENTS

| | | | | |
|---|---|---|---|---|
| 3,122,111 A * | 2/1964 | Taylor, Sr. | ............ | 111/80 |
| 3,729,238 A * | 4/1973 | Arnold | ............ | 384/211 |
| 3,817,042 A * | 6/1974 | Sanderson | ............ | 111/199 |
| 4,765,161 A * | 8/1988 | Williamson | ............ | 68/12.06 |
| 4,831,945 A * | 5/1989 | Neumeyer | ............ | 111/73 |
| 5,020,604 A * | 6/1991 | Peck | ............ | 172/177 |
| 5,304,014 A * | 4/1994 | Slutz | ............ | 405/129.9 |
| 5,645,025 A * | 7/1997 | Caya et al. | ............ | 123/90.42 |
| 5,676,073 A * | 10/1997 | Bergland et al. | ............ | 111/196 |
| 5,724,902 A * | 3/1998 | Janelle et al. | ............ | 111/164 |
| 5,802,995 A * | 9/1998 | Baugher et al. | ............ | 111/52 |
| 5,826,337 A * | 10/1998 | Klinkner et al. | ............ | 29/891 |
| 5,896,820 A * | 4/1999 | Klinkner et al. | ............ | 111/191 |
| 5,970,892 A * | 10/1999 | Wendling et al. | ............ | 111/139 |
| 6,223,663 B1 * | 5/2001 | Wendling et al. | ............ | 111/139 |

(Continued)

OTHER PUBLICATIONS

Fafnir Textron Agricultural Implement Bearings, 1978, p. 32.*

(Continued)

*Primary Examiner*—Christopher J. Novosad
(74) *Attorney, Agent, or Firm*—Jeffrey L. Thompson; Thompson & Thompson, P.A.

(57) ABSTRACT

A pivot assembly is provided for attaching a closing wheel frame to a planter. The closing wheel frame has a pair of closing wheels attached at a rear end and a pair of mounting openings formed at a front end. The pivot assembly includes ball bearings having outer races fit loosely within each of the mounting openings of the closing wheel frame. The inner races of the ball bearings are secured to the planter frame using threaded nut and bolt assemblies. The closing wheel frame is pivotal relative to the planter frame during normal operation by relative movement between the inner and outer races of the bearing. Variations of the mounting openings in the closing wheel frame are disclosed, including a tubular part, heavy washer or other annular structure welded to an outside surface of the closing wheel frame, or a bearing housing formed integral with the closing wheel frame.

12 Claims, 6 Drawing Sheets

U.S. PATENT DOCUMENTS 6,253,692 B1 * 7/2001 Wendling et al. ........... 111/139
6,530,334 B2 * 3/2003 Hagny ........................ 111/189
6,578,502 B1 * 6/2003 Barnstable et al. ......... 111/164

OTHER PUBLICATIONS

"Press Fix Kit" brochure for product of A&T Enterprises, Sherwood, Michigan (date unknown).*

* cited by examiner

PIVOT ASSEMBLY FOR PLANTER CLOSING WHEEL FRAME

RELATED APPLICATIONS

This application is a divisional application of U.S. patent application Ser. No. 10/435,311 filed on May 8, 2003, and the Applicant claims priority under 35 U.S.C. § 119(e) of provisional U.S. patent application Ser. No. 60/379,380 filed on May 8, 2002.

BACKGROUND OF THE INVENTION

1. Field of the Invention

The present invention relates generally to closing wheel assemblies for agricultural planters. In particular, the present invention relates to improved pivot assemblies for mounting closing wheel frames to planters.

2. Description of the Prior Art

The first "modern" planter was the John Deere 7000 series planter introduced in 1973. This planter is depicted in FIGS. 1, 2 and 3 of the accompanying drawings. This design utilized two opener disks 11 which contact at one point 12 and diverge at a small angle to form a furrow 13 in the ground. The depth of the furrow is determined by the adjustable position of the gauge wheels 14. The seed is dropped into a seed tube 15 and falls into the furrow 13.

A pair of closing wheels 16, which are mounted at an angle and are spring loaded to exert a downward force on the ground, then close the furrow 13 thereby covering the seed with soil. The closing wheels 16 are supported by a closing wheel frame 17. The closing wheel frame 17 was constructed from 0.164" thick sheet metal for many years until the introduction of the John Deere 1700 series planter.

The closing wheel frame 17 on the original John Deere 7000 series planter was attached to the shank assembly 18 at a pivot point 19. The pivot point 19 on each side of the closing wheel frame 17 consisted of a heat-treated 0.750" diameter bushing 20 (FIG. 3) clamped to the shank assembly 18 and the support casting 21 by a bolt 29 going through holes 22 in the shank assembly 18 and support casting 21. The outer bearing surface was a slightly larger than 0.750" hole 23 in the sheet metal of the closing wheel frame 17.

Down pressure for the closing wheels 16 was provided by an extension spring attached at 24 to the support casting 21. The spring pressure was adjusted by a bolt 25. Because the moment arm 26 of the spring about the pivot point 19 was small relative to the moment arm 27 of the wheel reaction 28, the spring pressure was necessarily large. This resulted in high pressure on the bearing surfaces of the bushing 20 and the sheet metal hole 23, which in turn resulted in accelerated wear on both the bushing 20 and the hole 23.

Uneven wear on those components resulted in the closing wheels 16 pulling to one side and prevented them from closing the furrow 13 adequately. To alleviate this problem, John Deere increased the size of the bushing 20 to 1.00" and changed the holes 22 to horizontal slots to allow the frame 17 to be adjusted to center the closing wheels 16 on the furrow 13. The slots were ineffective because by the time adjustment was needed, the parts obviously were worn which made it impossible to accurately relocate the bushings.

John Deere remedied this situation when they introduced the Model 7200 series planter in 1984. The bearing surface was increased to 1.562" diameter, and a cam was introduced on the right-hand side. To accommodate these changes the new support casting was attached with two vertical bolts that go through holes in the top of the casting. The above changes did not adequately alleviate the problem and in 1992 John Deere changed the rear hole in the top of the support casting to a lateral slot to allow more adjustment.

With the introduction of the Model 1700 series planters, John Deere improved the closing wheel frame pivot by increasing the frame bearing surface to 0.25" width and making it a casting. However, the thicker bearing surface and using steel on cast iron has not proven to be a major improvement over the earlier design.

Other manufacturers have experienced wear problems at the closing wheel frame pivot similar to John Deere but have basically stayed with a steel on steel bearing surface and have provided cams for adjustment. Several after-market repair kits have been available in recent years. Montezuma Welding and R K Products Inc. have provided a heat treated 0.250" thick outer bearing surface along with heat treated cams. May-Wes Manufacturing Inc. markets a bushing kit (PERMA-FIX™) that provides a substantial wear surface as well as the means for lubrication. A&T Enterprises offers a repair kit (PRESS FIX™) that utilizes ball bearings mounted in conventional "flangette" mountings. The flangette mountings allow for misalignment and still allow the bearing outer race to be clamped tightly. The bearing used has a 1.00" diameter bore that permits the use of a cam adjuster.

SUMMARY OF THE INVENTION

The present invention provides two uniquely simple and effective applications of a ball bearing to provide an economical and very durable pivot between the closing wheel frame and the planter frame on several planters that have been manufactured since 1973. The majority of these planters have been manufactured by John Deere or Kinze Manufacturing.

A first embodiment utilizes a simple tubular part as a housing for the ball bearing. The steel tubular housing is welded to the outside surface of the closing wheel frames, which are constructed from sheet metal. The tubular housing provides a mounting surface that loosely receives the outer race of the ball bearing. The tubular housing also permits the alternative use of a cam that can be applied interchangeably with the ball bearing.

A second embodiment utilizes a heavy steel washer welded to the outside surface of the cast closing wheel frame of John Deere Model 1700 series planters. The inside diameter of the washer is essentially the same as that of the frame opening. The inside surface of the washer and the inside surface of the frame opening serve together as a housing for the ball bearing.

The present invention provides the following advantages:

1. Allows use of a small, popular, economical and durable ball bearing.
2. Provides a simple and economical mounting for the ball bearing.
3. Utilizes the fact that several models of planters have adjustment features that can be used effectively with this design. Adjustment is occasionally necessary to compensate for damage and manufacturing variation.
4. Provides an interchangeable cam alternative to the ball bearing for those planter models that have no adjustment features but need to be adjusted.
5. The ease of interchangeability between the ball bearing and cam makes it practical to initially use cams on those planter models that have no adjustment features but need adjustment and later upgrade to the more durable ball bearings when time is available to correct the problem. This might be done by repairing the row unit or by relocating one of the bearing housings on the closing wheel frame.

6. The design of the second embodiment could be easily incorporated into future planters equipped with cast closing wheel frames. By making the cast closing wheel frame approximately 0.25" thicker in the pivot area, an excellent bearing housing would be provided. No change in the machined diameter of the frame opening would be necessary.

7. The design of the third and fourth embodiments could be easily incorporated into future planters equipped with sheet metal closing wheel frames. In these embodiments, a tubular bearing housing is formed integral in the sheet metal closing wheel frame for receiving the outer race of a ball bearing.

8. The pivot assemblies are easy to install and require very little time in comparison to conventional ball bearing assemblies.

9. Where ball bearings are used, wear and related maintenance is practically eliminated.

Numerous other objects of the present invention will be apparent to those skilled in this art from the following description wherein there is shown and described two preferred embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figures 1, 2:
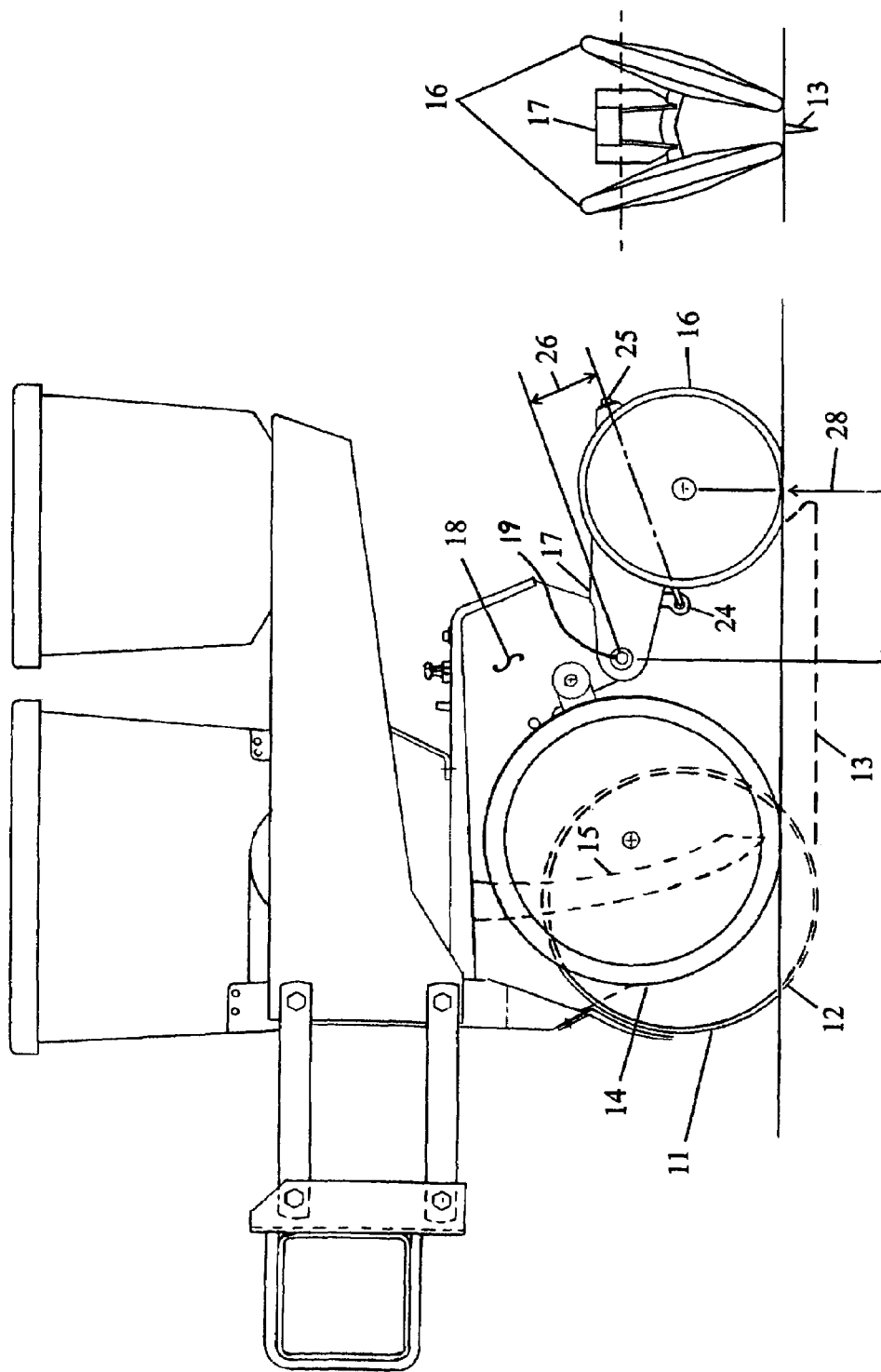
FIG. 1 is a side view of a planter unit and closing wheel assembly of a conventional agricultural planter.
FIG. 2 is a rear view of the closing wheel assembly of the conventional planter shown in FIG. 1.
Figure 3:
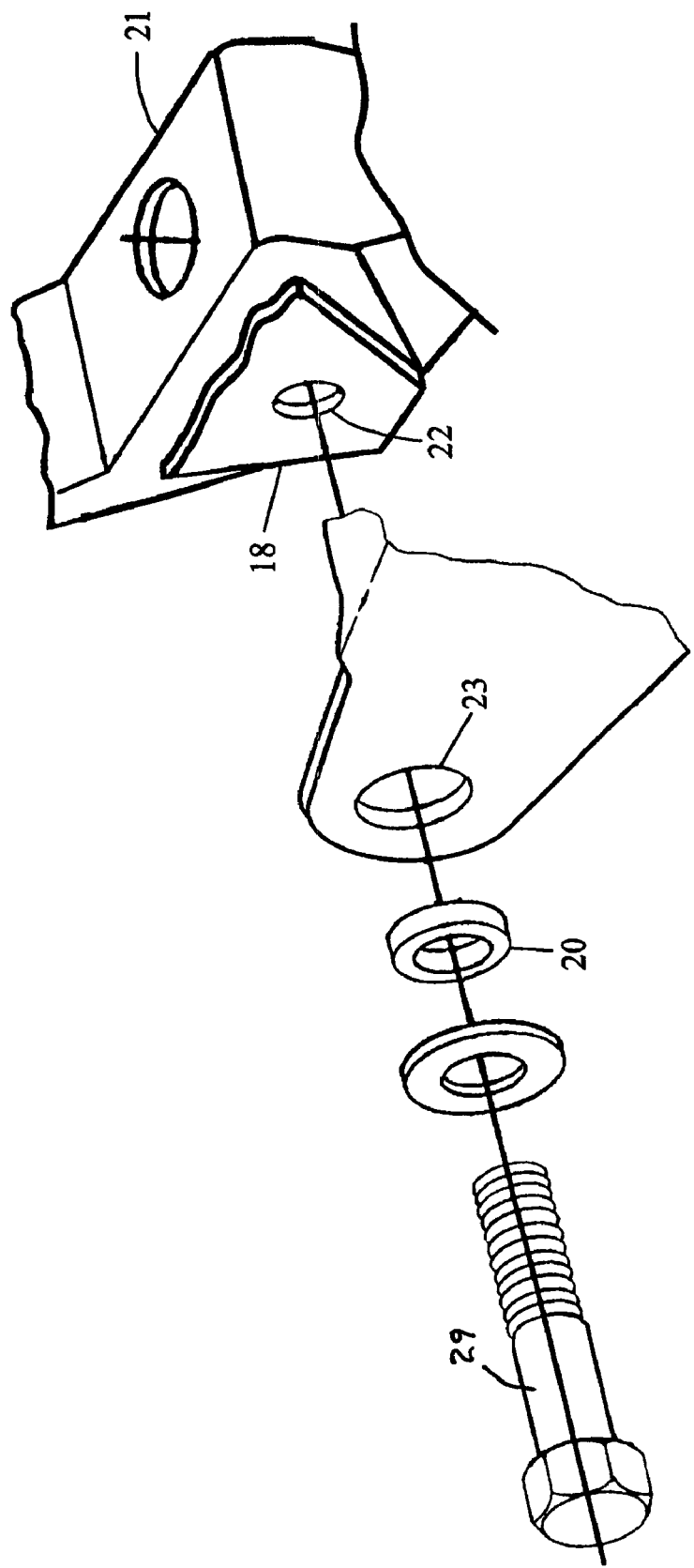
FIG. 3 is an exploded perspective view of a conventional pivot assembly for the closing wheel frame of the conventional planter shown in FIG. 1.

A closing wheel frame pivot assembly according to the first embodiment of the present invention will now be described with reference to FIG. 4 of the accompanying drawings. It should be noted that only the left hand parts of a complete pivot assembly are shown in the drawing. An identical set of parts is provided on the right side of the pivot assembly.

The first embodiment permits the use of a small, economical and very durable ball bearing 31 as a pivot for the closing wheel frame on most planters. The ball bearing 31 is mounted in a very unconventional manner. The bearing housing 32 is an annular structure in the form of a simple steel tubular part welded to the outside surface of planter closing wheel frames 33, which are made from sheet metal. The housing 32 is machined to provide approximately 0.005" to 0.040", and preferably about 0.015", clearance between the inner surface of the housing 32 and the outside surface of the outer race of the bearing 31. Such clearance provides a loose fit of the outer race within the housing 32 and allows for misalignment.

The inside surface of the inner race of the bearing 31 is clamped to the planter shank assembly 18 and/or the support casting 21 with a carriage bolt 34 and a nut 35. A clip (not shown) can be used to adapt the carriage bolt head and neck to the support casting 21 in some cases. Several 1" outside diameter flat washers 36 position the bearing 31 approximately in the center of the bearing housing 32. After the installation is complete, a thread deforming locking jam nut 37 is installed and tightened against the regular nut 35. On planters that originally had a 0.75" or 1.00" hole in the frame to serve as the outer bearing surface, the worn hole must be enlarged. This is to provide clearance between the flat washers 36 and the hole in the frame 33.

It should be noted that even if the ball bearing 31 would fail and lock up, the housing 32 would slip on the outer race of the bearing 31. This loose fit of the outer race of the bearing 31 within the housing 32 provides an excellent secondary pivot in case the primary pivot between the inner and outer races of the ball bearing 31 fails.

Figure 4:
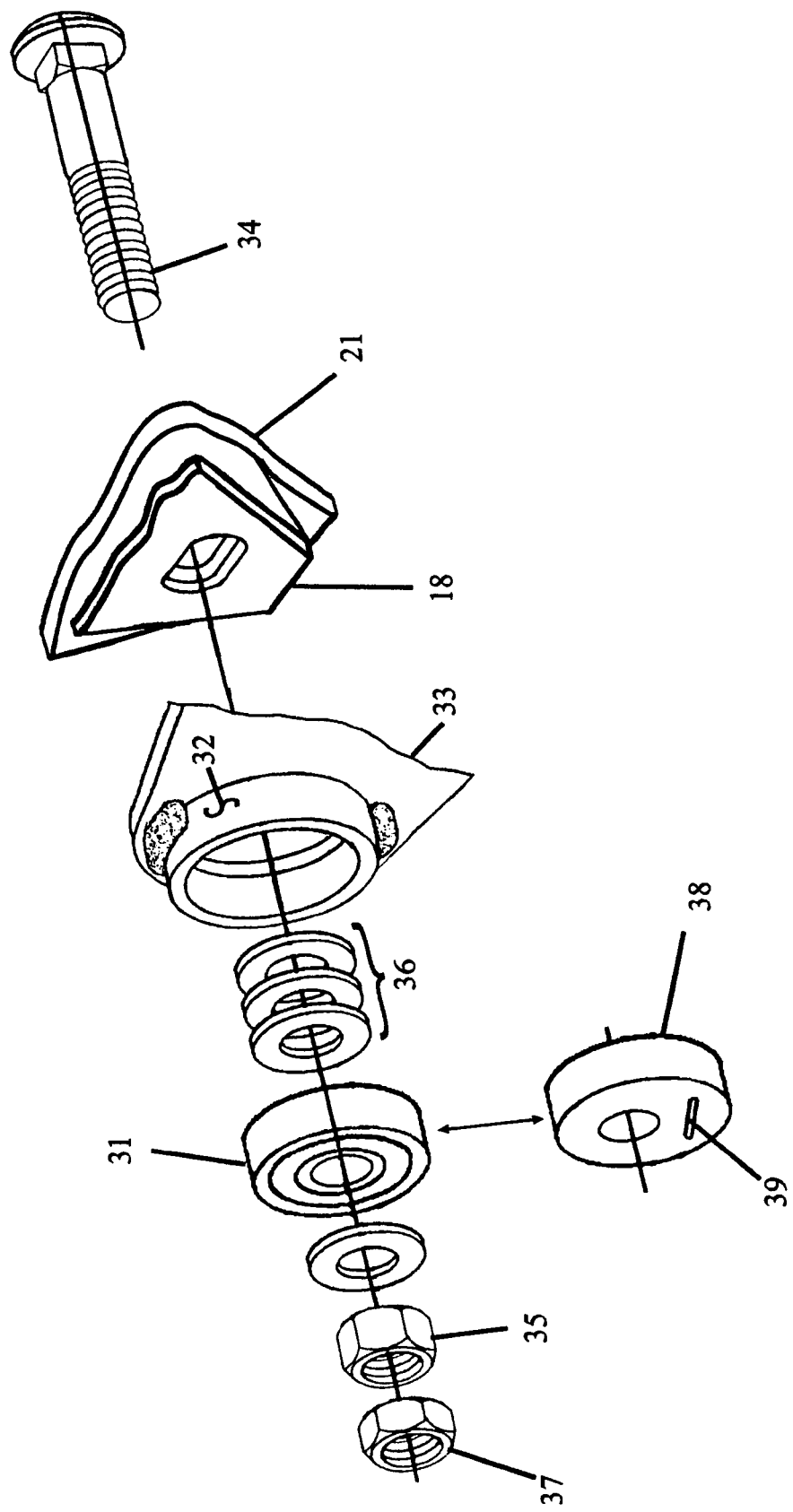
FIG. 4 is an exploded perspective view of a pivot assembly for a closing wheel frame according to a first embodiment of the present invention.

FIG. 4 also shows a new type of cam 38 that can be used interchangeably with the ball bearing 31. The cam 38 can be used to provide an adjustment when necessary to keep the closing wheels aligned properly. The outside diameter of the cam 38 is approximately 0.030" to 0.050", and preferably about 0.040", less than the inside diameter of the housing 32. This clearance permits adequate misalignment between the cam 38 and housing 32 to avoid putting the cam 38 in a bind when the cam 38 is adjusted.

The cam 38 is made from steel and is heat treated. The bolt hole is drilled off center, preferably by about 0.150". The cam adjustment is provided by rotating the cam 38 about the bolt 34. The cam 38 has several features that make it uniquely different from cams used in similar applications in the past. Other cams have a rectangular or hex boss to accept a wrench to be used for adjustment. In contrast, the Applicant's cam 38 shown in FIG. 4 has a milled slot 39 that accepts a screw driver for adjustment. Other cams have an unnecessary shoulder at the outer end of their bearing surface. The purpose of this is presumably to prevent the outer bearing surface of the frame from slipping off of the cam. The Applicant's cam 38 shown in FIG. 4 has no such shoulder. Because of the two features mentioned above, the length of the bearing surface provided by the cam 38 has been increased to approximately twice that of other conventional cams while actually shortening the overall length.

A closing wheel frame pivot assembly according to the second embodiment of the present invention will now be described with reference to FIG. 5 of the accompanying drawings.

Figure 5:
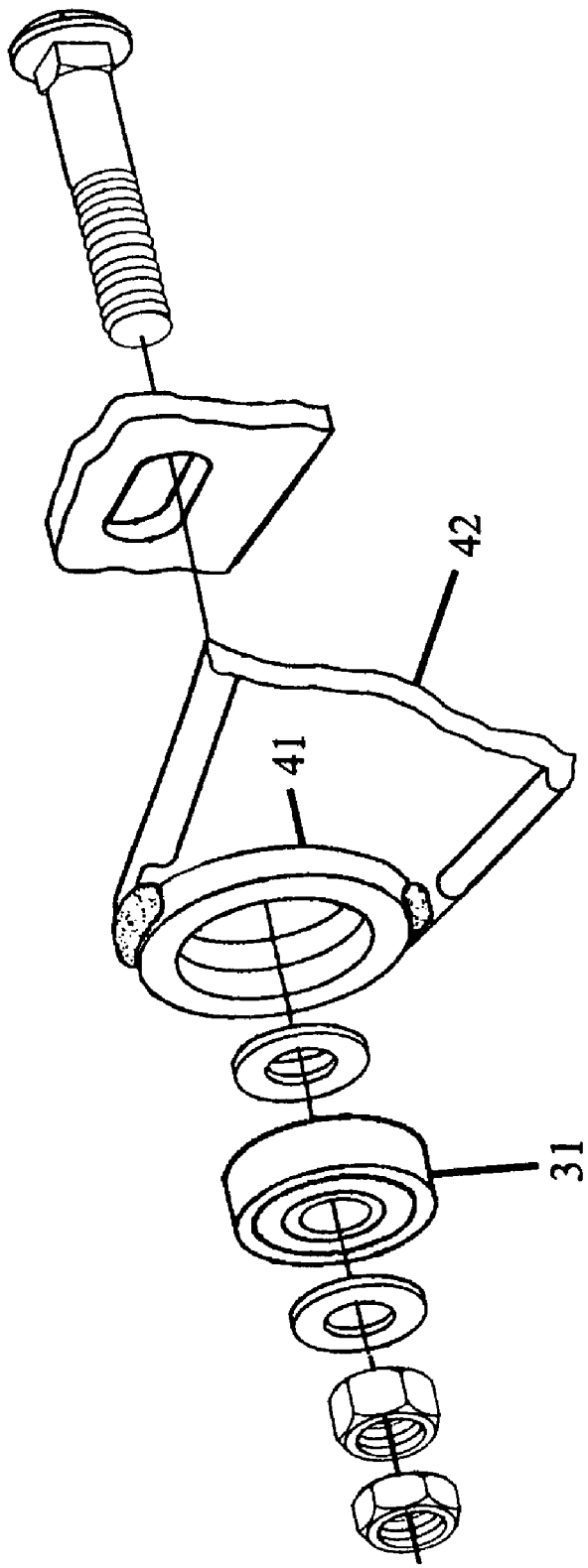
FIG. 5 is an exploded perspective view of a pivot assembly for a closing wheel frame according to a second embodiment of the present invention.

FIG. 5 shows the ball bearing 31 as it is applied to a John Deere Model 1700 series planter according to the Applicant's invention. In this case, an annular structure in the form of a heavy metal washer 41, e.g., a 1.562 I.D.×2.19 O.D.×0.250" thick washer, is welded to the outside surface of the cast closing wheel frame 42. The 0.250" thick cast material of the closing wheel frame 42 and the heavy washer 41 together make an excellent bearing housing. The tubular housing 32 shown in FIG. 4 could be used with the cast closing wheel frame 42, but the heavy washer 41 is more desirable. When the washer 41 is welded to the outer surface of a worn cast frame 42, the washer 41 may contact the bearing 31 only at the outer end. This is acceptable in this lightly loaded application. It should be noted that the bearing 31 could be used on new John Deere Model 1700 series planters in place of the current pivot parts without the heavy washer 41, but the appearance would be unusual. A more desirable approach to incorporate the Applicant's invention into new John Deere planters would be to increase the thickness of the casting of the cast frame 42 around the bearing 31, e.g., by 0.250".

Closing wheel frame pivot assemblies according to the third and fourth embodiments of the present invention will now be described with reference to FIGS. 6 and 7 of the accompanying drawings.

The third and fourth embodiments of the present invention provide integral designs that can be incorporated into future planters having sheet metal closing wheel frames. In these integral designs, the tubular bearing housings 32 shown in FIG. 4 are replaced with bearing housings 32a, 32b that are formed integrally in the-sheet metal frames 33a, 33b.

Figures 6, 7:
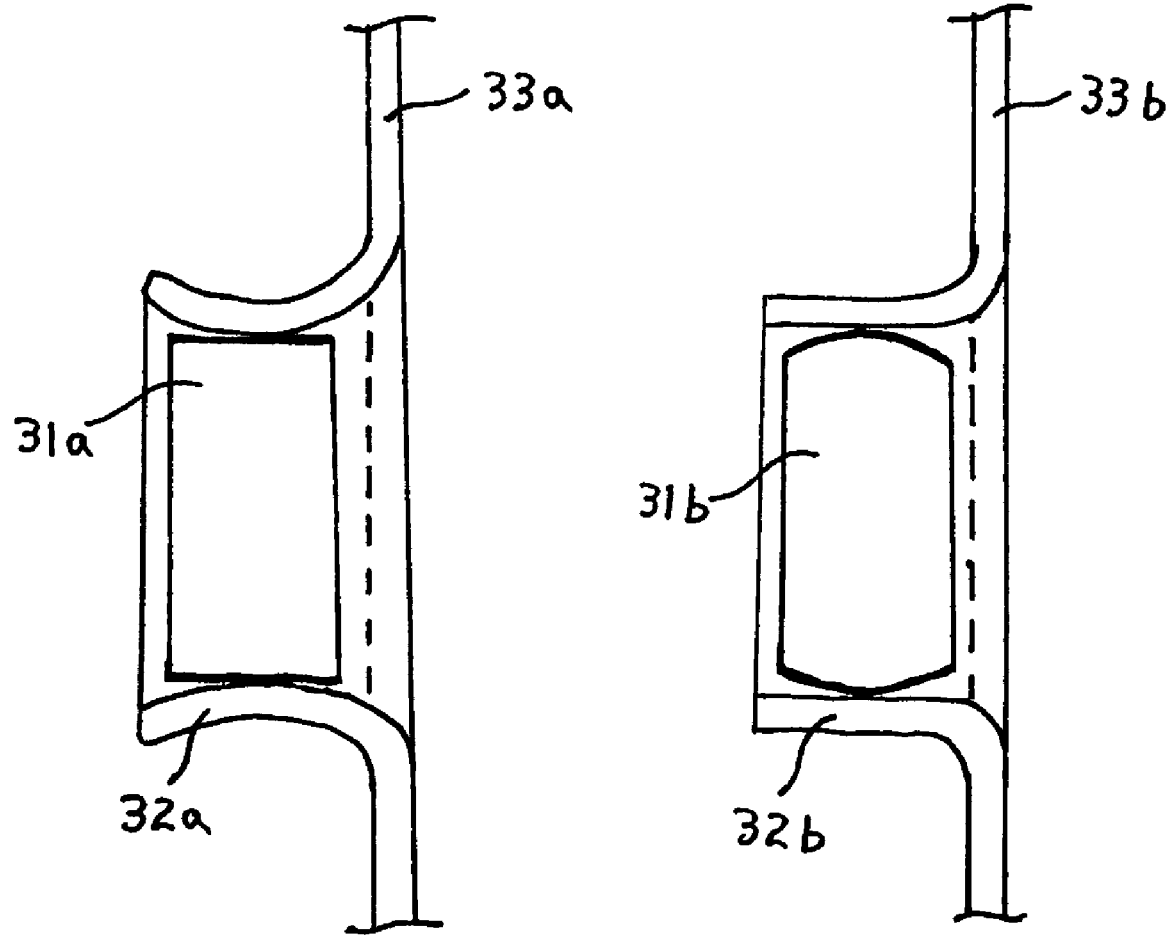
FIG. 6 is a cross section view of a frame opening formed in a sheet metal closing wheel frame according to a third embodiment of the present invention.
FIG. 7 is a cross section view of a frame opening formed in a sheet metal closing wheel frame according to a fourth embodiment of the present invention.

In FIG. 6, the bearing housing 32a is formed integral with the sheet metal closing wheel frame 33a and has an inside diameter which is slightly smaller at its center and flared at its ends. This flared configuration allows a closer fit between the housing 32a and a cylindrical bearing 31a, while allowing the bearing 31a to pivot slightly within the housing 32a for alignment.

In FIG. 7, the bearing housing 32b is formed integral with the sheet metal closing wheel frame 33b and has a generally cylindrical inside diameter. The outer surface of the outer race of the ball bearing 31b is spherical to facilitate alignment of the bearing 31b with the bolt and other parts of the closing wheel frame as described above.

In the embodiments of FIGS. 6 and 7, the outer surface of the bearings 31a, 31b fit within the integral bearing housings with a loose fit. However, since either the inner surface of the bearing housing (32a in FIG. 6) or the outside surface of the outer race of the bearing (31b in FIG. 7) are curved, a closer fit, e.g., 0.005" clearance, can be provided between the bearing 31a, 31b and the housing 32a, 32b while still allowing the bearing to pivot slightly for alignment.

Figure 8:
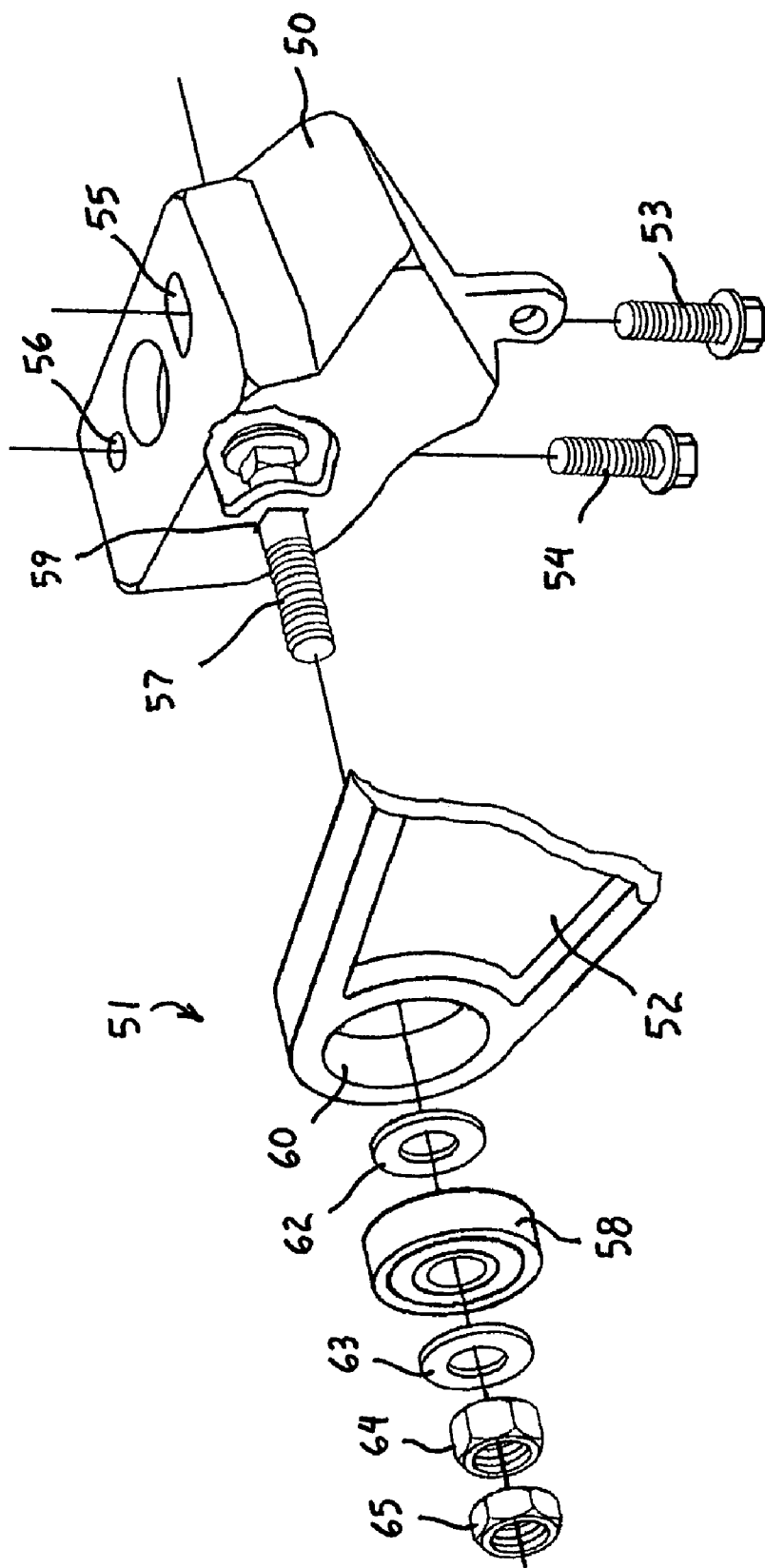
FIG. 8 is an exploded perspective view of a support casting and pivot assembly for a closing wheel frame according to a fifth embodiment of the present invention.

A closing wheel frame pivot assembly according to a fifth embodiment of the present invention will now be described with reference to FIG. 8 of the drawings. In FIG. 8, a support casting 50 and pivot assembly 51 for attaching a closing wheel frame 52 to a planter are shown. The support casting 50 shown in FIG. 8 is similar to the later (1992 and up) John Deere Model 7200 series planters and allows adjustment of the support casting 50 relative to the shank assembly (not shown) of the planter frame. The support casting 50 is attached to the shank assembly of the planter frame by two vertical bolts 53, 54. The adjustment is provided by a lateral slot 55 in the top of the support casting 50 for the rear bolt 53. The front bolt 54 passes through a round hole 56 in the top of the support casting 50. This arrangement allows the support casting 50 to be pivoted laterally without loosening the bolts 57 that clamp the bearings 58 to the sides of the support casting 50. The lateral adjustment provided by the lateral slot 55 minimizes or eliminates the possibility of misalignment between the ball bearings 58.

The ball bearings 58 are located by holes 59 in the sides of the support casting 50 and bolted in place within the respective bearing housings 60 of the cast closing wheel frame 52 using carriage bolts 57. The bearing housings 60 are formed integrally in the cast closing wheel frame 52 and have a width that corresponds to the width of the ball bearings 58. As in the embodiments described above, flat washers 62, 63 are used to position the ball bearings 58 approximately in the center of the bearing housings 60, threaded nuts 64 cooperate with the threaded bolts 57 to secure the inner races of the bearings 58 to the support casting 50, and threaded locking jam nuts 65 are used to keep the threaded nuts 64 locked in place. With this arrangement, the ball bearings 58 remain aligned with each other during lateral adjustment of the closing wheel frame 52, and a tighter fit between the bearings 58 and housings 60 is possible. However, a fairly loose fit is still desirable to facilitate removal of the bearings 58 from the housings 60 and to provide a secondary pivot in case the ball bearing 58 fails.

While the invention has been specifically described in connection with specific embodiments thereof, it is to be understood that this is by way of illustration and not of limitation, and the scope of the appended claims should be construed as broadly as the prior art will permit.

What is claimed is:

1. A pivot assembly for attaching a closing wheel frame to a planter frame, comprising:
   a closing wheel frame having a closing wheel attached at a rear end and a mounting opening at a front end;
   a ball bearing having an outer race and an inner race, the outer race being fit within said mounting opening at the front end of the closing wheel frame;
   a threaded bolt that extends through a hole in a laterally adjustable support casting of the planter frame and through an opening in said inner race; and
   a threaded nut placed on said bolt and operable in conjunction with said bolt to secure the inner race of the bearing to the support casting of the planter frame, whereby the closing wheel frame is pivotal relative to the support casting of the planter frame during normal operation by relative movement between the inner race and outer race of the bearing.

2. The pivot assembly according to claim 1, wherein said mounting opening is formed integral with said closing wheel frame.

3. The pivot assembly according to claim 1, further comprising at least one flat washer placed on the bolt between the inner race and the planter frame to position the inner race approximately in a center of the mounting opening.

4. The pivot assembly according to claim 1, wherein a substantially identical pivot assembly is provided on each side of the closing wheel frame for attaching the closing wheel frame to the support casting of the planter frame.

5. The pivot assembly according to claim 4, wherein said support casting has a means for allowing the support casting to be pivoted laterally to provide for lateral adjustment of the closing wheel frame without loosening the threaded nut and bolt that secure the inner race of the bearing to the support casting.

6. The pivot assembly according to claim 5, wherein said means for allowing the support casting to be pivoted laterally comprises at least one lateral slot formed in a top of the support casting.

7. The pivot assembly according to claim 1, wherein said outer race of the ball bearing is fit loosely within the mounting opening at the front end of the closing wheel frame.

8. An agricultural planter, comprising:
a furrow opener that forms a furrow in the ground;
a seed tube for directing seed into the furrow; and
a closing wheel assembly for closing the furrow after the seed is placed in the furrow, the closing wheel assembly comprising a closing wheel frame having a pair of closing wheels attached at a rear end and a pair of mounting openings formed integrally at a front end, the closing wheel frame being secured to a laterally adjustable support casting of a frame of the planter by a pair of pivot assemblies each comprising:
 a ball bearing having an outer race and an inner race, the outer race being fit within a respective one of said mounting openings at the front end of the closing wheel frame;
 a threaded bolt that extends through a hole in the planter frame and through an opening in said inner race; and
 a threaded nut placed on said bolt and operable in conjunction with said bolt to secure the inner race of the bearing to the support casting, whereby the closing wheel frame is pivotal relative to the planter frame during normal operation by relative movement between the inner and outer races of the bearing, and whereby the closing wheel frame is laterally adjustable by lateral adjustment of the support casting on which the closing wheel frame is mounted.

9. The planter according to claim 8, wherein said support casting has a means for allowing the support casting to be pivoted laterally to provide for lateral adjustment of the closing wheel frame without loosening the threaded nut and bolt that secure the inner race of the bearing to the support casting.

10. The planter according to claim 9, wherein said means for allowing the support casting to be pivoted laterally comprises at least one lateral slot formed in a top of the support casting.

11. The planter according to claim 8, further comprising at least one flat washer placed on each of the bolts between the inner race and the support casting to center the inner races within the mounting openings.

12. The planter according to claim 8, wherein said outer race of the ball bearing is fit loosely within the mounting opening at the front end of the closing wheel frame.

* * * * *